US009441691B2

(12) United States Patent
Kong et al.

(10) Patent No.: US 9,441,691 B2
(45) Date of Patent: Sep. 13, 2016

(54) ELECTRIC DISK BRAKE

(71) Applicant: MANDO CORPORATION, Pyeongtaek-si (KR)

(72) Inventors: Young-Hun Kong, Gunpo-si (KR); Jae-Hyun Lee, Incheon (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/736,223

(22) Filed: Jun. 10, 2015

(65) Prior Publication Data

US 2015/0362031 A1    Dec. 17, 2015

(30) Foreign Application Priority Data

Jun. 17, 2014    (KR) ........................ 10-2014-0073246

(51) Int. Cl.
*B60L 7/00*    (2006.01)
*F16D 65/18*    (2006.01)
(Continued)

(52) U.S. Cl.
CPC .............. F16D 65/18 (2013.01); F16D 55/225 (2013.01); *F16D 2121/02* (2013.01); *F16D 2121/24* (2013.01); *F16D 2125/36* (2013.01); *F16D 2125/52* (2013.01)

(58) Field of Classification Search
CPC ........... F16D 2125/44; F16D 2125/46; F16D 2125/56; F16D 2125/565; F16D 2125/34; F16D 2125/36; F16D 2125/40; F16D 2125/20; F16D 2121/24
See application file for complete search history.

(56) References Cited

U.S. PATENT DOCUMENTS

| | | | | |
|---|---|---|---|---|
| 2008/0283345 | A1* | 11/2008 | Balz | F16D 65/18 188/72.6 |
| 2011/0094836 | A1* | 4/2011 | Liao | F16D 65/18 188/82.8 |
| 2012/0292141 | A1 | 11/2012 | Takahashi | |

FOREIGN PATENT DOCUMENTS

| | | |
|---|---|---|
| JP | 5-22234 | 3/1993 |
| JP | 2000-145843 A | 5/2000 |
| KR | 10-1130339 B1 | 3/2013 |
| KR | 10-2013-0034605 A | 4/2013 |
| KR | 10-1331783 | 11/2013 |

OTHER PUBLICATIONS

Notice of Allowance dated Sep. 23, 2015 for Korean Patent Application No. 10-2014-0073246 and its English summary provided by Applicant's foreign counsel.
(Continued)

*Primary Examiner* — Nicholas J Lane
(74) *Attorney, Agent, or Firm* — Ladas & Parry, LLP (57) ABSTRACT

Disclosed herein is an electric disk brake including: a carrier in which a pair of pad plates for pressing both sides of a rotating disk together with wheels are installed to make advance and retreat; a caliper housing that is slidably installed in the carrier and has a cylinder in which a piston is installed to make advance and retreat due to brake hydraulic pressure; an adjuster disposed in the piston; a push rod that is installed in the cylinder and is screw-coupled to the adjuster; a ramp unit that is installed to penetrate the rear of the cylinder, converts a rotation motion into a rectilinear motion by receiving a rotation force from an actuator that generates a parking brake force, and presses the push rod toward the piston; and an elastic member that is disposed in a spring case formed between an inner circumferential surface of the cylinder and the push rod and provides an elastic force to the push rod, further including a connector having one end coupled to a rotating ramp plate of the ramp unit so that the connector is rotated together with the rotating ramp plate, and having the other end connected to a final output gear among a plurality of gears configured to decelerate a rotation force generated from the actuator so that the rotation force is transferred only in a direction in which a brake force is generated in the rotating ramp plate, wherein at least one hole is spaced by a predetermined distance apart from a center of the connector in a radial direction and is formed in an arc shape, and protrusions are formed in the final output gear to penetrate the at least one hole and to rotate, and the connector includes: a first coupling part that penetrates a center of the final output gear and is coupled to the rotating ramp plate; and a second coupling part, which extends from the first coupling part in a radial direction and in which the at least one hole is formed in the radial direction of a center of the second coupling part.

4 Claims, 6 Drawing Sheets

(51) Int. Cl.
*F16D 55/225* (2006.01)
*F16D 121/24* (2012.01)
*F16D 121/02* (2012.01)
*F16D 125/36* (2012.01)
*F16D 125/52* (2012.01)

(56) References Cited

OTHER PUBLICATIONS

Office Action of Mar. 23, 2015 for corresponding Korean Patent Application No. 10-2014-0073246.

* cited by examiner

ELECTRIC DISK BRAKE

CROSS-REFERENCE TO RELATED APPLICATION

This application claims the benefit of Korean Patent Application No. 10-2014-0073246, filed on Jun. 17, 2014 in the Korean Intellectual Property Office, the disclosure of which is incorporated in its entirety herein by reference.

BACKGROUND

1. Field

Embodiments of the present invention relate to an electric disk brake, and more particularly, to an electric disk brake that is easily capable of easily controlling an actuator when a parking brake force is released from the electric disk brake and of preventing damage of components caused by releasing an excessive parking brake force.

2. Description of the Related Art

Disk brakes are devices that forcibly compress a frictional pad on both sides of a rotating disk together with wheels of a vehicle so that rotation of the disk is stopped, thereby braking the vehicle. These disk brakes include parking brakes that electrically operate during parking and maintain the vehicle in a stopped state.

In general, an electric disk brake includes a pair of pad plates that are disposed on both sides of a disk and generate a brake force by compressing the disk, a carrier that supports the pair of pad plates, a caliper housing that is slidably installed in the carrier so as to press the pair of pad plates and has a piston moved by a brake hydraulic pressure, and an actuator that operates the piston using a mechanical mechanism.

Such an electric disk brake includes a so-called ball in ramp (BIR) type electric disk brake including a fixed ramp plate fixedly installed in the caliper housing, a rotating ramp plate that rotates by an operation of a parking cable, balls that are installed between the fixed ramp plate and the rotating ramp plate and make a forward movement of the rotating ramp plate when the rotating ramp plate is rotated, a push rod that is disposed adjacent to the rotating ramp plate and pushes the piston, an adjuster screw-coupled to the push rod, and a spring that restores the push rod to its original position.

The BIR type electric disk brake is generally referred to as a BIR caliper type and is disclosed in U.S. Patent Publication No. 2012/029214 and Korean Patent Publication No. 10-2013-0034605. According to the disclosure, the BIR type electric disk brake is configured in such a way that, as a rotation force generated by a motor of an actuator is transferred to the rotating ramp plate of a ramp unit using a decelerator (gear assembly), a rotation motion is converted into a rectilinear motion and pushes the push rod, and the push rod pushes the piston together with the adjuster so that a frictional pad can closely contact the disk and a parking brake force can be generated.

In this case, the rotating ramp plate is directly connected to a final output gear among gears of the decelerator, receives the rotation force, and is rotated in a direction in which the parking brake force is applied to the rotating ramp plate, or is rotated in a direction in which the parking brake force is released from the rotating ramp plate.

However, when an excessive rotation force is transferred to the rotating ramp plate when the parking brake force is released, the balls may escape from the ramp unit, or an excessive load may be applied to internal components so that the internal components may be damaged.

PRIOR-ART DOCUMENT

Patent Document (Patent document 1) US 2012/0292141 A (AKEBONO BRAKE INDUSTRY CO., LTD) Nov. 22, 2012, FIG. 1

(Patent document 2) Korean Patent Publication No. 10-2013-0034605 (Hitachi Automotive Systems) Apr. 5, 2013, FIG. 1

SUMMARY

Therefore, it is an aspect of the present invention to provide an electric disk brake in which a rotating ramp plate that converts a rotation motion into a rectilinear motion and a connector that connects a final output gear transferring a rotation force to the rotating ramp plate are disposed and the rotation force is transferred only in a direction in which a parking brake force is generated, using the connector so that, even when an excessive rotation force is generated in the rotating ramp plate when the parking brake force is released from the rotating ramp plate, the rotation force is not transferred to the rotating ramp plate.

Additional aspects of the invention will be set forth in part in the description which follows and, in part, will be obvious from the description, or may be learned by practice of the invention.

In accordance with one aspect of the present invention, an electric disk brake includes: a carrier in which a pair of pad plates for pressing both sides of a rotating disk together with wheels are installed to make advance and retreat; a caliper housing that is slidably installed in the carrier and has a cylinder in which a piston is installed to make advance and retreat due to brake hydraulic pressure; an adjuster disposed in the piston; a push rod that is installed in the cylinder and is screw-coupled to the adjuster; a ramp unit that is installed to penetrate the rear of the cylinder, converts a rotation motion into a rectilinear motion by receiving a rotation force from an actuator that generates a parking brake force, and presses the push rod toward the piston; and an elastic member that is disposed in a spring case formed between an inner circumferential surface of the cylinder and the push rod and provides an elastic force to the push rod, further including a connector having one end coupled to a rotating ramp plate of the ramp unit so that the connector is rotated together with the rotating ramp plate, and having the other end connected to a final output gear among a plurality of gears configured to decelerate a rotation force generated from the actuator so that the rotation force is transferred only in a direction in which a brake force is generated in the rotating ramp plate, wherein at least one hole may be spaced by a predetermined distance apart from a center of the connector in a radial direction and may be formed in an arc shape, and protrusions may be formed in the final output gear to penetrate the at least one hole and to rotate, and the connector may include: a first coupling part that penetrates a center of the final output gear and is coupled to the rotating ramp plate; and a second coupling part, which extends from the first coupling part in a radial direction and in which the at least one hole is formed in the radial direction of a center of the second coupling part.

The connector may be configured so that the final output gear is rotated in a direction in which a parking brake force is generated and the protrusions rotate from a time when the protrusions contact a distal end of one side of the at least one hole to transfer a rotation force to the rotating ramp plate.

The protrusions may rotate toward a distal end of the other side of the at least one hole when the final output gear is rotated in a direction in which the parking brake force is released, and as the rotating ramp plate rotates in an opposite direction like rotating in a direction in which the parking brake force is generated, the connector may be rotated together with the rotating ramp plate so that contact between the protrusions and a distal end of the other side of the at least one hole is prevented.

The ramp unit may include: a fixed ramp plate having an opened front and fixedly installed in the cylinder; a rotating ramp plate that is disposed in the fixed ramp plate, penetrates the rear of the fixed ramp plate and the rear of the cylinder, is coupled to the connector and rotates by a transferred rotation force; and a plurality of balls that are interposed between the rotating ramp plate and the push rod and allow the push rod to make a forward movement when the rotating ramp plate is rotated.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout. The following embodiment is proposed to sufficiently convey the spirit of the invention to one of ordinary skill in the art. The invention is not limited by the proposed embodiment but may be embodied in different shapes. In the drawings, for clarity, illustration of unrelated parts to description is omitted, and for understanding, sizes of components may be slightly exaggerated.

Figure 1:
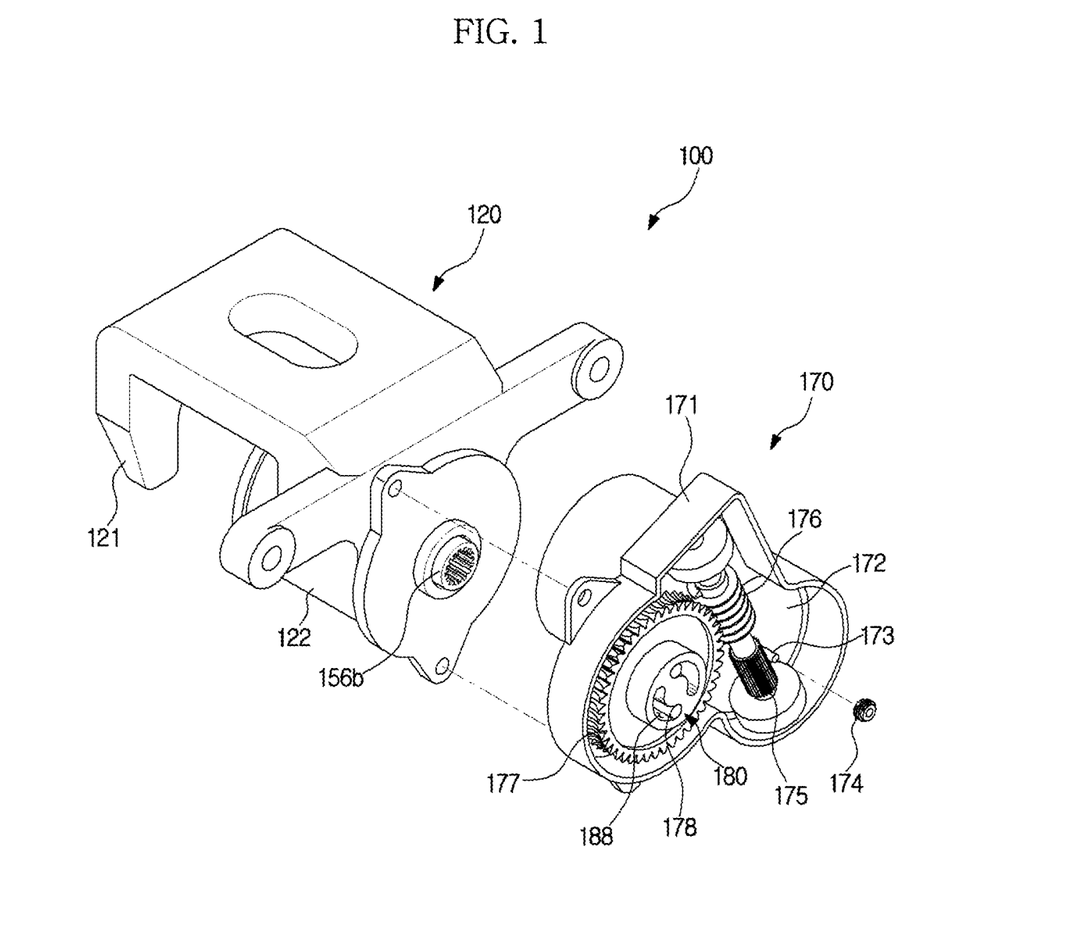
FIG. 1 is an exploded perspective view schematically illustrating an electric disk brake in accordance with an embodiment of the present invention.
Figure 2:
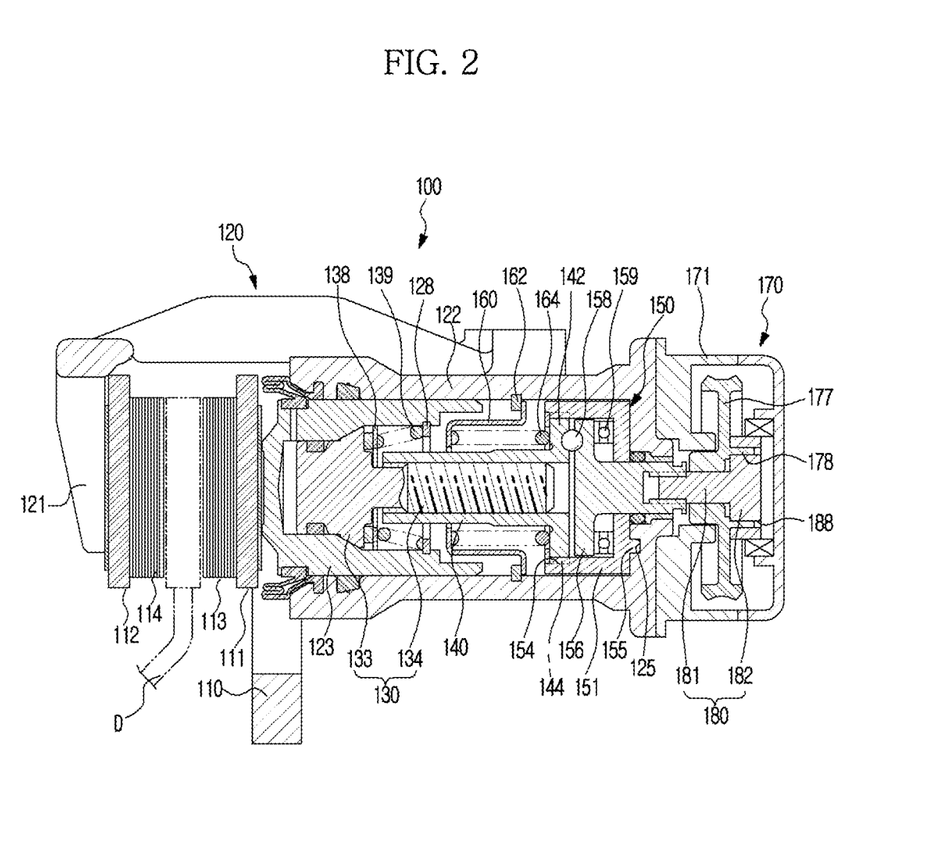
FIG. 2 is a side cross-sectional view of assembling of FIG. 1.

FIG. 1 is an exploded perspective view schematically illustrating an electric disk brake in accordance with an embodiment of the present invention, and FIG. 2 is a side cross-sectional view of assembling of FIG. 1.

Referring to FIGS. 1 and 2, an electric disk brake 100 in accordance with an embodiment of the present invention includes a carrier 110 in which a pair of pad plates 111 and 112 for pressing both sides of a rotating disk D together with wheels (not shown) are installed to make advance and retreat, a caliper housing 120 that is slidably installed in the carrier 110 and has a cylinder 122 in which a piston 123 is installed to make advance and retreat due to brake hydraulic pressure, an adjuster 130 that prevents the pad plates 111 and 112 from being far away from the disk D and maintains a constant distance between the pad plates 111 and 112, a push rod 140 that is screw-coupled to the adjuster 130, a ramp unit 150 that supports the push rod 140 so as to prevent rotation of the push rod 140 and is installed in the cylinder 122, a spring case 160 that forms a predetermined accommodation space between an inner side surface of the cylinder 122 and the push rod 140, an elastic member 164 disposed in the spring case 160, an actuator 170 that generates a parking brake force, and a connector 180 that conveys the parking brake force to the ramp unit 150.

The carrier 110 is fixed to a knuckle of a vehicle using a mounting bolt (not shown), and the caliper housing 120 is slidably fastened on both ends of the carrier 110 using a guide rod (not shown). Also, the pair of pad plates 111 and 112 are disposed in a center of the carrier 110 to be spaced by a predetermined distance apart from each other and to be slidable in a direction in which they face each other.

The pair of pad plates 111 and 112 are classified into an inner pad plate 111 that is disposed to contact the piston 123 that will be described later and has an inner side surface to which a frictional pad 113 is attached, and an outer pad plate 112 that is disposed to contact a finger part 121 that will be described later and has an inner side surface to which a frictional pad 114 is attached. In this case, the disk D has a shape of a disk that rotates together with the wheels (not shown) of the vehicle. The disk D rotates in a state in which a part of the disk D is inserted between the pair of pad plates 111 and 112.

The caliper housing 120 includes the finger part 121 that operates the outer pad plate 112 and the cylinder 122 having the piston 123 disposed therein so that the cylinder 122 may slide due to brake hydraulic pressure. In this case, a hydraulic duct (not shown) is formed on one end of the caliper housing 120 so that the brake hydraulic pressure may be supplied to the cylinder 122 through the hydraulic duct.

The finger part 121 is formed to be bent from the front to a lower side of the caliper housing 120 so as to surround the outer pad plate 112 from outside. Thus, as the caliper housing 120 slides from the carrier 110 due to a reaction force caused by movement of the piston 123 and is moved to the right when a brake operation is performed, the outer pad plate 112 is pushed by the finger part 121 toward the disk D and presses the disk D.

The cylinder 122 is formed in the rear of the caliper housing 120 so that the brake hydraulic pressure formed in a master cylinder (not shown) may be transferred to the cylinder 122. The piston 123 is installed in the cylinder 122 to make advance and retreat. That is, the piston 123 installed in the cylinder 122 makes advance and retreat in the cylinder 122 due to the brake hydraulic pressure. The push rod 140 and the ramp unit 150 that will be described later are installed in the cylinder 122 in addition to the piston 123.

The piston 123 is disposed to have a shape of a cup having one opened side, and a head part 133 of the adjuster 130 that will be described later is inserted into and contacts an inner center of the piston 123.

The adjuster 130 includes the head part 133 that is installed in the piston 123 inserted into the cylinder 122 and contacts the piston 123 and a rod 134 that extends from the head part 133 and has a screw thread formed on an outer circumferential surface of the rod 134. In this case, the head part 133 is inserted into and contacts an inside of the piston 123 through the opened side of the piston 123, as described above.

The adjuster 130 prevents the pad plates 111 and 112 from being far away from the disk D as the frictional pads 113 and 114 attached to the pair of pad plates 111 and 112 are worn out, and maintains a constant distance between the pad plates 111 and 112. Washers 128 and 138 are installed at an inner side surface of the piston 123 and a rear wall of the head part 133, respectively, and a washer spring 139 is disposed between the washers 128 and 138. That is, the adjuster 130 is disposed in contact with the piston 123 due to an elastic force of the washer spring 139 installed between the inner side surface of the piston 123 and the head part 133. Thus, the washer spring 139 presses the adjuster 130 toward a tip end of the piston 123 so that the adjuster 130 and the piston 123 are always in contact with each other even though the frictional pads 113 and 114 of the pad plates 111 and 112 are worn out by friction with the disk D and a position of the piston 123 is moved to the inner pad plate 111.

The push rod 140 installed in the cylinder 122 is screw-coupled to the rear of the adjuster 130, i.e., the rod 134. Thus, the adjuster 130 coupled to the piston 123 makes a forward movement together when the piston 123 makes a forward movement due to the brake hydraulic pressure. In this case, the push rod 140 screw-coupled to the adjuster 130 makes a forward movement together. Thus, the adjuster 130 and the push rod 140 are configured so that a distance between screw-coupled screw threads may be reduced. That is, although a distance between screw threads of the adjuster 130 and the push rod 140 generally exists, the adjuster 130 is pressed in a forward direction (left side) of the piston 123 so that the distance between the screw threads may be reduced and movements of the adjuster 130 and the push rod 140 may occur simultaneously.

The push rod 140 has a hollow center part so that the push rod 140 may be screw-coupled to the adjuster 130, and a screw thread is formed on an inner circumferential surface of the push rod 140, and a flange part 142 is disposed in the rear of the push rod 140 and extends toward an inner circumferential surface of the cylinder 122. The push rod 140 is supported on the ramp unit 150 that will be described later, and rotation of the push rod 140 is prevented. A rotation prevention structure of the push rod 140 will be described again.

As the push rod 140 is screw-coupled to the adjuster 130 in a state in which rotation of the push rod 140 is prevented, the adjuster 130 may be moved in a lengthwise direction of the push rod 140. That is, when the frictional pads 113 and 114 are worn out and the piston 123 is moved, the adjuster 130 is rotated from the push rod 140 due to characteristics of the adjuster 130 in which the adjuster 130 closely contacts the piston 123 due to the washer spring 139, and is moved by a movement distance of the piston 123 and is maintained in close contact with the piston 123. Thus, a constant distance between the pad plates 111 and 112 pressed by the disk D and the piston 123 is maintained.

Meanwhile, a plurality of coupling protrusions 144 are formed on the flange part 142 of the push rod 140 and are spaced by a predetermined distance apart from each other along an outer circumferential surface of the flange part 142 and protrude outwardly. As the coupling protrusions 144 are inserted into coupling grooves 154 formed in a fixed ramp plate 151 of the ramp unit 150, rotation of the push rod 140 is prevented, and the coupling protrusions 144 are coupled to the ramp unit 150.

The ramp unit 150 includes the fixed ramp plate 151 fixedly installed in the cylinder 122, a rotating ramp plate 156 that is coupled to the connector 180 connected to the actuator 170 that will be described later and rotates by a transferred rotation force, and a plurality of balls 158 interposed between the push rod 140 and the rotating ramp plate 156.

The fixed ramp plate 151 has a shape of a cylinder, the front of which is opened. The flange part 142 of the push rod 140 is disposed in the fixed ramp plate 151, and the coupling grooves 154 are formed so that the coupling protrusions 144 of the flange part 142 may be inserted into the coupling grooves 154, as described above.

Meanwhile, the fixed ramp plate 151 is installed in the cylinder 122 so that rotation of the fixed ramp plate 151 may be prevented. According to the drawings, rotation prevention protrusions 155 are formed in the rear of the fixed ramp plate 151 and protrude outwardly, and rotation prevention grooves 125 that correspond to the rotation prevention protrusions 155 are formed in the cylinder 122 in positions corresponding to the rotation prevention protrusions 155. Thus, as the rotation prevention protrusions 155 are inserted into the rotation prevention grooves 125, rotation of the fixed ramp plate 151 is prevented, and rotation of the push rod 140 coupled to the fixed ramp plate 151 is also prevented.

The rotating ramp plate 156 includes an axial part 156b that penetrates the rear of the fixed ramp plate 151 and the rear of the cylinder 122 and protrudes toward an outside of the caliper housing 120 and a pressing part 156a that is disposed in the fixed ramp plate 151 and extends from an end of the axial part 156b in a radial direction. In this case, the axial part 156b that protrudes toward the outside of the caliper housing 120 is coupled to the connector 180 that will be described later, and a rotation force is transferred to the axial part 156b using the connector 180.

Meanwhile, unexplained reference numeral 159 is a bearing that is interposed between the rotating ramp plate 156 and the fixed ramp plate 151 and supports rotation of the rotating ramp plate 156.

The plurality of balls 158 are interposed on opposite surfaces of the rotating ramp plate 156 and the push rod 140, and guide grooves (not shown) that support the plurality of balls 158 are formed in the opposite surfaces. The guide grooves are formed to be inclined so that, as the rotating ramp plate 156 is rotated, the balls 158 are moved along the inclined grooves and allow the push rod 140 to make a rectilinear motion. A configuration of making a rectilinear motion of the push rod 140 using the balls 158 is a well-known technology that is generally used, and thus, a detailed description thereof will be omitted.

The spring case 160 is configured to form a predetermined accommodation space between the push rod 140 and the inner side surface of the cylinder 122. In detail, one end of the spring case 160 is fixed onto the inner side surface of the cylinder 122 using a snap ring 162, and the elastic member 164 that restores the push rod 140 to its original position so as to restore the piston 123 is disposed in the spring case 160.

One end of the elastic member 164 is supported on one side surface of the spring case 160, and the other end of the elastic member 164 is supported on the flange part 142 of the push rod 140 so that the elastic member 164 may be configured to provide an elastic force to the push rod 140 in a movement direction of the piston 123.

The actuator 170 includes a motor 172 that generates a brake force, a decelerator including a plurality of gears so as to decelerate a rotation force of the motor 172, and a housing 171 that accommodates the motor 172 and the decelerator and is installed at an outside of the caliper housing 120.

The decelerator has a two-stage deceleration structure in which a plurality of gears are engaged so as to decelerate the rotation force of the motor 172 that rotates forward and reverse by power applied to the decelerator. According to the drawings, the decelerator that has a two-stage worm wheel deceleration structure includes a first worm 174 coupled to a rotation shaft 173 of the motor 172, a first worm wheel 175 engaged with the first worm 174, a second worm 176 that has the same axis as that of the first worm wheel 175 and is rotated by the first worm wheel 175, and a second worm wheel 177 that rotates while being engaged with the second worm 176. In this case, the second worm wheel 177 is a gear that outputs a decelerated rotation force, and hereinafter, is referred to as a final output gear 177.

Meanwhile, the decelerator of the electric disk brake according to the present invention has a worm wheel deceleration structure. However, the present invention is not limited thereto, and various gear assembling structures including a spur gear assembling structure to which the rotation force of the motor 172 may be transferred, may be employed. That is, the decelerator decelerates the rotation force using various gear assembling structures, and any gear assembling structure that may transfer the rotation force using the final output gear 177 may be employed.

According to an embodiment of the present invention, the connector 180 installed in the final output gear 177 is provided to transfer the rotation force to the rotating ramp plate 156 of the ramp unit 150. The connector 180 is configured to transfer the rotation force to the rotating ramp plate 156 only in one direction using the final output gear 177, and an assembling structure of the connector 180 is illustrated in FIG. 3.

Figure 3:
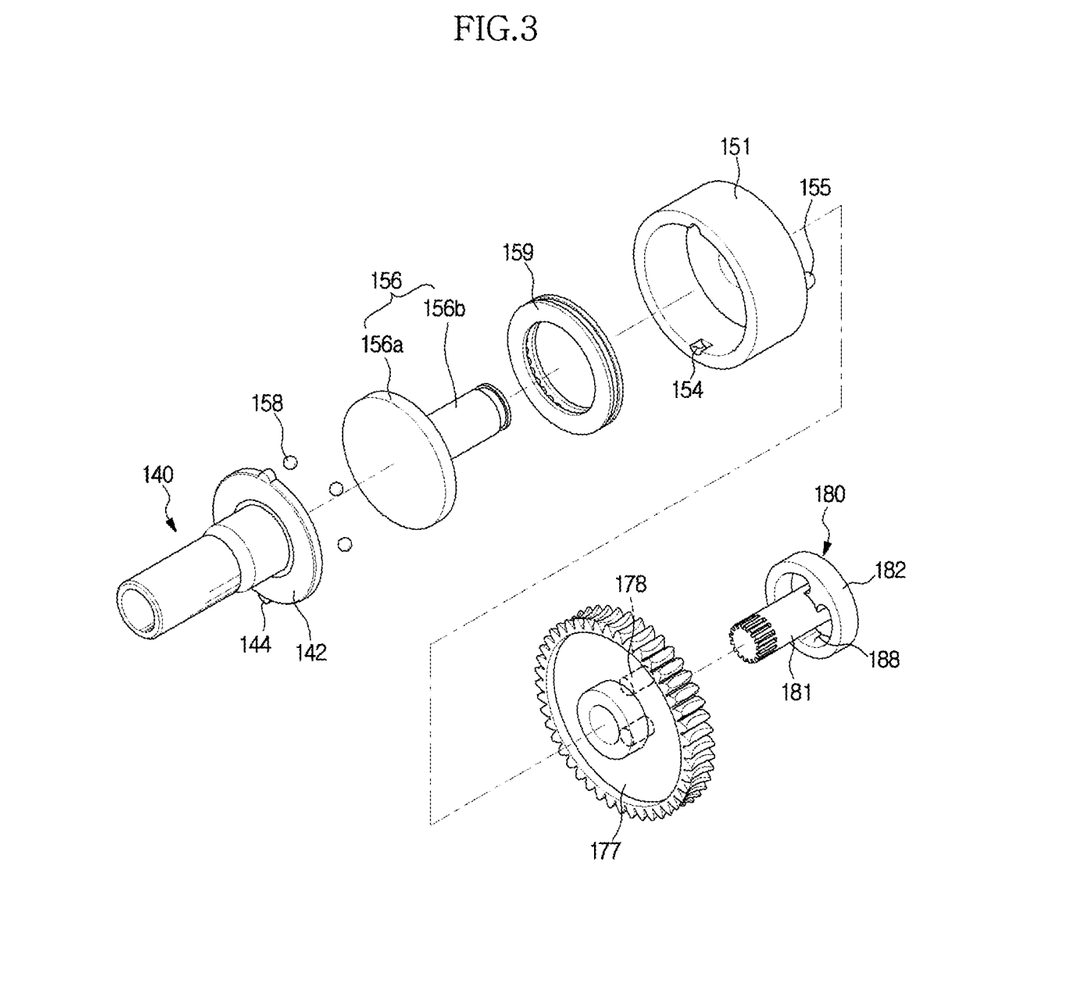
FIG. 3 is an exploded perspective view illustrating a state in which a ramp unit and a final output gear are connected to each other using a connector included in the electric disk brake in accordance with an embodiment of the present invention.

Referring to FIG. 3, the connector 180 is configured so that one end of the connector 180 is coupled to the rotating ramp plate 156 so as to rotate together with the rotating ramp plate 156 and the other end of the connector 180 is connected to the final output gear 177 and the connector 180 transfers the rotation force to the rotating ramp plate 156. In more detail, the connector 180 includes a first coupling part 181 that penetrates a center of the final output gear 177 and is coupled to the rotating ramp plate 156, a second coupling part 182 that extends from the first coupling part 181 in the radial direction, and holes 188 that are spaced by a predetermined distance apart from each other in the radial direction based on a center of the second coupling part 182. In this case, the second coupling part 182 is placed at an outside of the final output gear 177. Also, at least one or more holes 188 are formed in the second coupling part 182.

Figure 4:
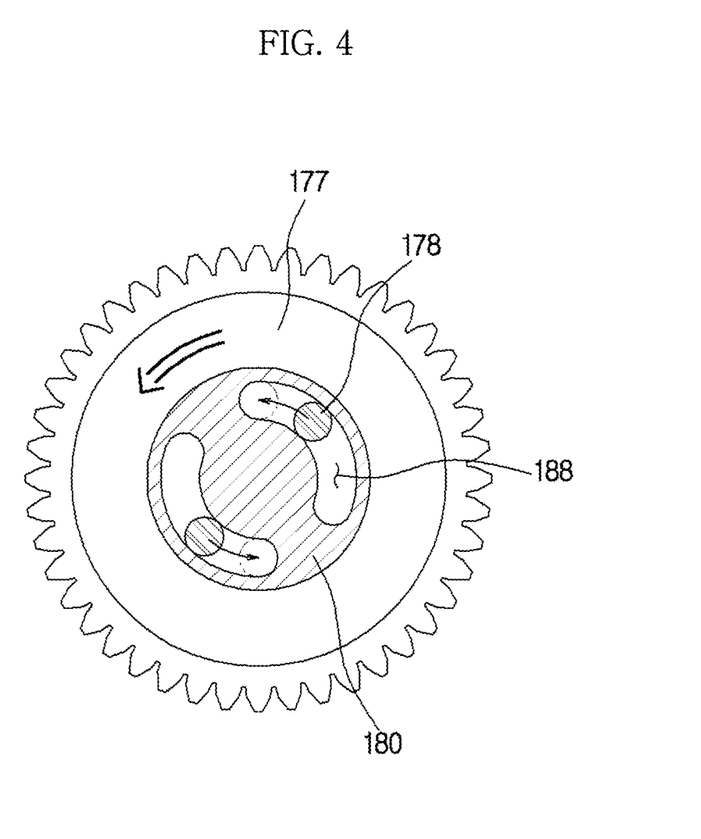
FIG. 4 is a view illustrating a state in which power is transmitted to the electric disk brake using the connector included in the electric disk brake in accordance with an embodiment of the present invention.

In order to transfer the rotation force to the rotating ramp plate 156 using the above-described connector 180, pin-shaped protrusions 178 are disposed in the final output gear 177 so as to penetrate the holes 188. The protrusions 178 are rotated along the holes 188 together when the final output gear 177 is rotated. Thus, as illustrated in FIG. 4, the rotation force is transferred to the connector 180 from a time when the protrusions 178 are rotated along the holes 188 and contact a distal end of one side of the holes 188 when the final output gear 177 is rotated in one direction (a direction in which the final output gear 177 generates a parking brake force). That is, the rotating ramp plate 156 coupled to the connector 180 is rotated together with the connector 180.

Meanwhile, the holes 188 are formed in the connector 180, and the protrusions 178 are disposed in the final output gear 177 so that the rotation force is transferred to the rotating ramp plate 156 only in one direction. However, the present invention is not limited thereto, and protrusions that are formed in the second coupling part 182 of the connector 180 and protrude toward the final output gear 177, and arc-shaped holes through which the protrusions pass are formed in the final output gear 177 so that the rotation force may be transferred to the rotating ramp plate 156 only in one direction using the connector 180.

As described above, the electric disk brake 100 according to an embodiment of the present invention is configured to transfer the rotation force only in the direction in which the parking brake force is generated, using the connector 180. In more detail, referring to FIGS. 5 and 6, when the final output gear 177 is rotated in a direction in which the parking brake force is released, the protrusions 178 are rotated toward a distal end of the other side of the holes 188 so that the rotation force may not be transferred to the connector 180. In this case, the connector 180 is rotated together with the rotating ramp plate 156 as the rotating ramp plate 156 rotates in an opposite direction like rotating in the direction in which the parking brake force is generated. That is, even when the final output gear 177 is rotated in the direction in which the parking brake force is released, the protrusions 178 are rotated in the other-side direction of the holes 188, and the connector 180 is rotated in the same direction as a rotation direction of the final output gear 177, and contact between the holes 188 and the protrusions 178 is not performed so that power may not be transmitted to the rotating ramp plate 156 using the protrusions 178. This is because self-locking is not possible due to characteristics of the ramp unit 150 and a rotation force is generated in the rotating ramp plate 156 in a direction in which the rotating ramp plate 156 is brake-released due to loads applied to the frictional pads 113 and 114 when the brake force is released from the rotating ramp plate 156 and the rotating ramp plate 156 and the connector 180 are rotated together by the push rod 140 pressed by the elastic member 164.

Figure 5:
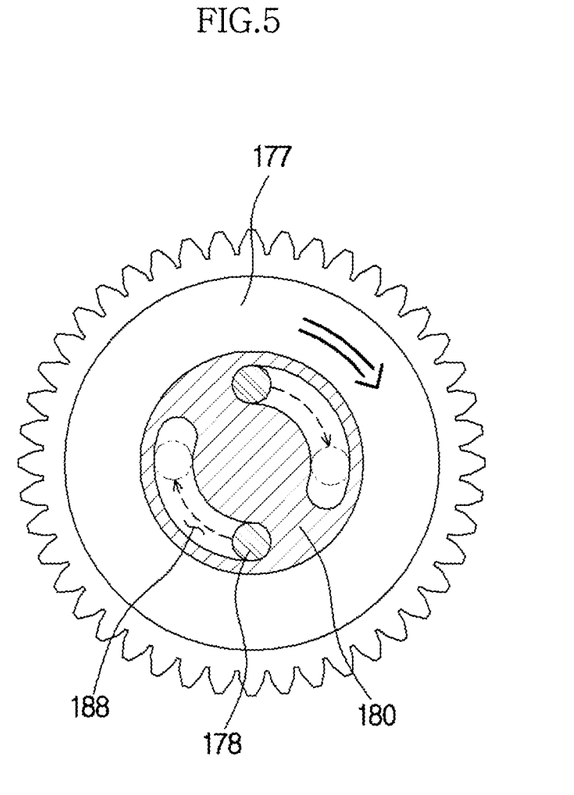
FIGS. 5 and 6 are views illustrating a state in which a parking brake force is released from the electric disk brake using the connector included in the electric disk brake in accordance with an embodiment of the present invention, respectively.
Figure 6:
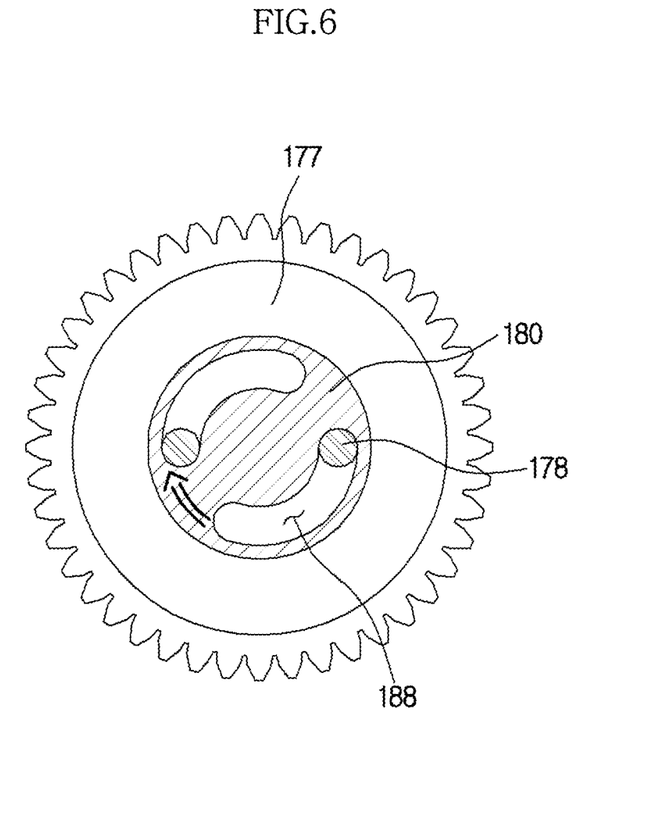

As a result, the electric disk brake 100 according to an embodiment of the present invention is configured so that a rotation force may be transferred to the electric disk brake 100 only in a direction in which a parking brake force is generated, using a coupling structure of the connector 180 and even when an excessive rotation force is generated in the rotating ramp plate 156 when the parking brake force is released from the rotating ramp plate 156, the rotation force may not be transferred to the rotating ramp plate 156 and damage of the ramp unit 150 may be prevented.

As described above, an electric disk brake according to an embodiment of the present invention includes a connector that connects a final output gear of a decelerator and a rotating ramp plate of a ramp unit that converts a rotation motion into a rectilinear motion, and a rotation force is transferred to the rotating ramp plate only in a direction in which a parking brake force is generated, using the connector so that, even when an excessive rotation force is generated in the rotating ramp plate in a direction in which the parking brake force is released from the rotating ramp plate, escape of balls or damage of components can be prevented.

This is because arc-shaped holes are formed in the connector in a circumferential direction and rotating protrusions are inserted into the holes together with a final output gear and rotate along the holes. That is, when the parking brake force is applied to the rotating ramp plate, the protrusions rotate along the holes and contact a distal end of one side of the holes so as to transfer the rotation force to the connector, and when the parking brake force is released, the protrusions rotate in an opposite direction to a direction in which the parking brake force is applied to the rotating ramp plate, and rotate along the holes, and as the rotating ramp plate rotates in the opposite direction like rotating in a direction in which the parking brake force is generated, the connector is rotated together with the rotating ramp plate so that the rotation force when the parking brake force is released, may not be transferred to the rotating ramp plate. Thus, control of an actuator that generates the parking brake force can be easily performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric disk brake comprising:
    a carrier in which a pair of pad plates for pressing both sides of a rotating disk are installed, wherein the pair of pad plates are configured to advance and retreat with respect to the rotating disk;
    a caliper housing that is slidably installed in the carrier and has a cylinder in which a piston is installed, wherein the piston is configured to make the pair of pad plates advance and retreat due to brake hydraulic pressure;
    an adjuster disposed in the piston;
    a push rod that is installed in the cylinder and is screw-coupled to the adjuster;
    a ramp unit that is installed to penetrate the rear of the cylinder, converts a rotation motion into a rectilinear motion by receiving a rotation force from an actuator that generates a parking brake force, and presses the push rod toward the piston;
    an elastic member that is disposed in a spring case formed between an inner circumferential surface of the cylinder and the push rod and provides an elastic force to the push rod,
    a connector having one end coupled to a rotating ramp plate of the ramp unit so that the connector is rotated together with the rotating ramp plate, and having the other end connected to a final output gear among a plurality of gears configured to decelerate a rotation force generated from the actuator so that the rotation force is transferred only in a direction in which a brake force is generated in the rotating ramp plate,
    wherein at least one hole is spaced by a predetermined distance apart from a center of the connector in a radial direction and is formed in an arc shape, and
    protrusions are formed in the final output gear to penetrate the at least one hole and to rotate, and
    the connector comprises:
        a first coupling part that penetrates a center of the final output gear and is coupled to the rotating ramp plate; and
        a second coupling part, which extends from the first coupling part in a radial direction and in which the at least one hole is formed in the radial direction of a center of the second coupling part.

2. The electric disk brake of claim 1, wherein the connector is configured so that the final output gear is rotated in a direction in which a parking brake force is generated and the protrusions rotate from a time when the protrusions contact a distal end of one side of the at least one hole to transfer a rotation force to the rotating ramp plate.

3. The electric disk brake of claim 1, wherein the protrusions rotate toward a distal end of the other side of the at least one hole when the final output gear is rotated in a direction in which the parking brake force is released, and
    as the rotating ramp plate rotates in an opposite direction like rotating in a direction in which the parking brake force is generated, the connector is rotated together with the rotating ramp plate so that contact between the protrusions and a distal end of the other side of the at least one hole is prevented.

4. The electric disk brake of claim 1, wherein the ramp unit comprises:
    a fixed ramp plate having an opened front and fixedly installed in the cylinder;
    a rotating ramp plate that is disposed in the fixed ramp plate, penetrates the rear of the fixed ramp plate and the rear of the cylinder, is coupled to the connector and rotates by a transferred rotation force; and
    a plurality of balls that are interposed between the rotating ramp plate and the push rod and allow the push rod to make a forward movement when the rotating ramp plate is rotated.

* * * * *